(12) United States Patent
Iwai et al.

(10) Patent No.: US 11,319,879 B2
(45) Date of Patent: May 3, 2022

(54) MANUFACTURING METHOD OF TURBINE CASING

(71) Applicant: TOSHIBA ENERGY SYSTEMS & SOLUTIONS CORPORATION, Kawasaki (JP)

(72) Inventors: Shogo Iwai, Ota (JP); Tsuguhisa Tashima, Yokohama (JP); Toshio Morimoto, Yokohama (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 284 days.

(21) Appl. No.: 16/713,075

(22) Filed: Dec. 13, 2019

(65) Prior Publication Data

US 2020/0191060 A1   Jun. 18, 2020

(30) Foreign Application Priority Data

Dec. 17, 2018   (JP) .............................. JP2018-235130

(51) Int. Cl.
*F02C 7/24*   (2006.01)

(52) U.S. Cl.
CPC ............ *F02C 7/24* (2013.01); *F05D 2220/30* (2013.01); *F05D 2230/25* (2013.01); *F05D 2230/26* (2013.01); *F05D 2230/90* (2013.01)

(58) Field of Classification Search
CPC .................. F02C 7/24; F05D 2220/30; F05D 2300/5021; F05D 2230/25; F05D 2230/26; F05D 2230/90
See application file for complete search history.

(56) References Cited

U.S. PATENT DOCUMENTS

| 2014/0023478 | A1  | 1/2014 | Maeda et al. |
| 2015/0121898 | A1  | 5/2015 | Tashima et al. |
| 2016/0146052 | A1* | 5/2016 | McGinnis ............... F01D 25/24 415/200 |
| 2020/0080435 | A1* | 3/2020 | Durocher ................ F01D 9/065 |

FOREIGN PATENT DOCUMENTS

| JP | 61-138804 A | 6/1986 |
| JP | 61-229481 A | 10/1986 |
| JP | 2004-169562 A | 8/2004 |
| JP | 2010-38101 A | 2/2010 |
| JP | 5917324 B2 | 5/2016 |
| JP | 6013288 B2 | 10/2016 |
| WO | WO 2017/068616 A1 | 4/2017 |

\* cited by examiner

*Primary Examiner* — Moshe Wilensky
(74) *Attorney, Agent, or Firm* — Oblon, McClelland, Maier & Neustadt, L.L.P.

(57) ABSTRACT

There is provided a manufacturing method of a turbine casing capable of easily realizing improvement of reliability. A manufacturing method of a turbine casing according to an embodiment is a manufacturing method of a turbine casing which includes an outer casing formed of ferritic heat resistant steel and an inner casing disposed inside the outer casing and formed of austenitic heat resistant steel, and in which an exhaust hood to which a working medium after performing work in turbine stages is exhausted, is covered by the inner casing. Here, the inner casing is manufactured by using members produced by at least either forging or rolling.

6 Claims, 9 Drawing Sheets

MANUFACTURING METHOD OF TURBINE CASING

CROSS REFERENCE TO RELATED APPLICATIONS

This application is based upon and claims the benefit of priority from the prior Japanese Patent Application (No. 2018-235130), filed on Dec. 17, 2018; the entire contents of which are incorporated herein by reference.

FIELD

Embodiments of the present invention relate to a manufacturing method of a turbine casing.

BACKGROUND

A supercritical $CO_2$ power generation system is a power generation system which uses a working fluid containing carbon dioxide ($CO_2$) in a supercritical state as a main component, and is attracting attention because of concern for the environment. This power generation system can collect supercritical $CO_2$ generated during power generation as needed, and can dramatically decrease $CO_2$ which is released into the atmosphere by using CCS (Carbon dioxide Capture and Storage) and CCU (Carbon dioxide Capture and Utilization) in a combined manner.

Figure 7:
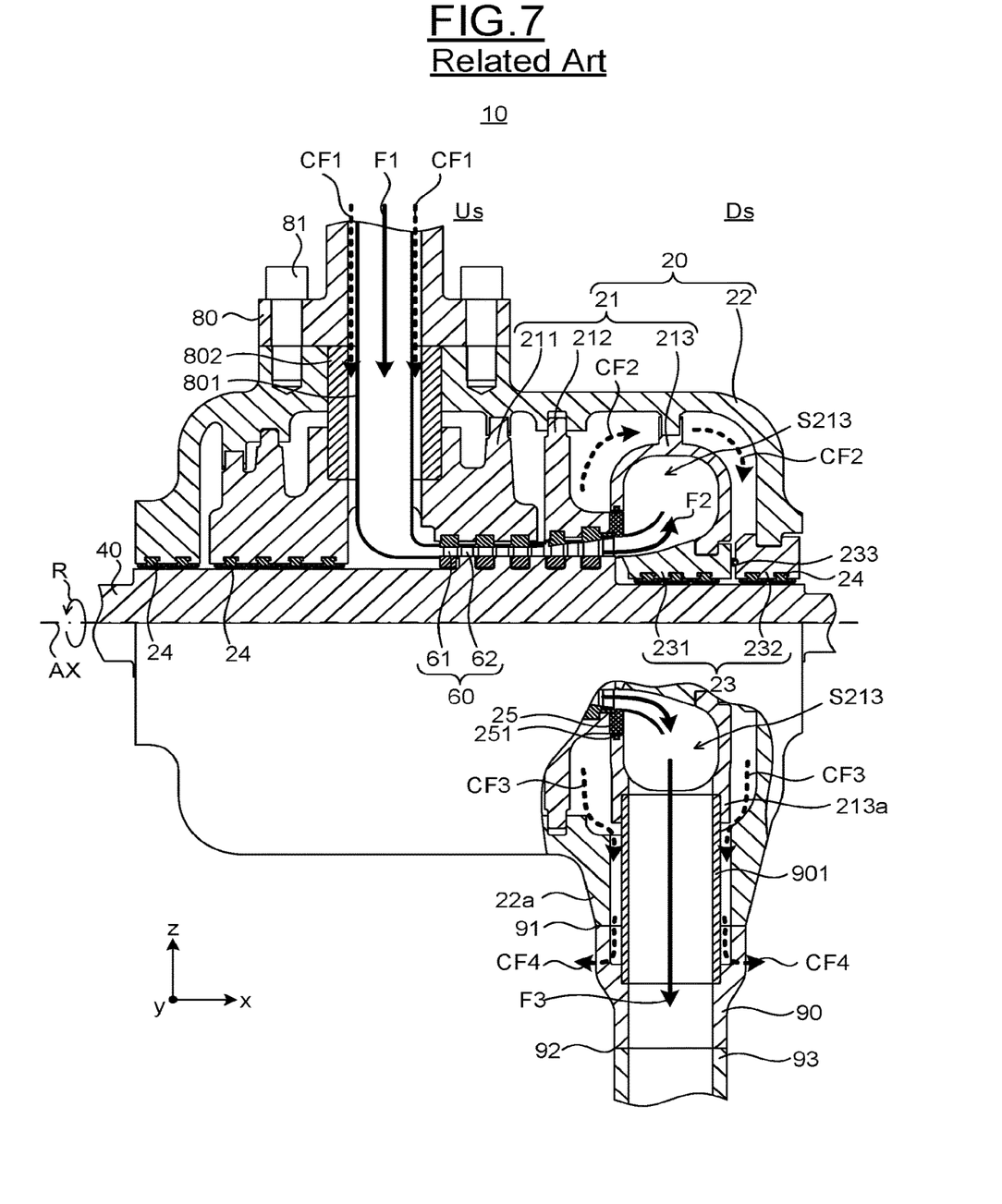
FIG. 7 is a view illustrating a substantial part of a turbine according to a related art.

One example of a structure of a supercritical $CO_2$ turbine 10 configuring a supercritical $CO_2$ power generation system will be described by using FIG. 7. FIG. 7 illustrates a partial cross section of a vertical plane (xz plane), in which a longitudinal direction indicates a vertical direction z, a lateral direction indicates a first horizontal direction x, and a direction orthogonal to the paper surface indicates a second horizontal direction y. Further, in FIG. 7, flows of working media F1, F2, F3 are indicated by arrow marks of heavy solid lines, the left side indicates an upstream side Us, and the right side indicates a downstream side Ds. Besides, in FIG. 7, flows of cooling media CF1, CF2, CF3, CF4 are indicated by arrow marks of heavy broken lines.

As illustrated in FIG. 7, the supercritical $CO_2$ turbine 10 includes a turbine casing 20 and a turbine rotor 40, and is configured such that when the working medium F1 containing carbon dioxide ($CO_2$) in a supercritical state as a main component is supplied thereto, the turbine rotor 40 is rotated inside the turbine casing 20. Here, the supercritical $CO_2$ turbine 10 is a multistage axial flow turbine, and plural turbine stages 60 are arranged in an axial direction along a rotation center axis AX of the turbine rotor 40 (the first horizontal direction x).

Concrete contents of respective parts configuring the supercritical $CO_2$ turbine 10 will be described in order.

The turbine casing 20 has an inner casing 21 and an outer casing 22, and has a double structure in which the inner casing 21 is housed inside the outer casing 22.

The turbine casing 20 includes a first inner casing 211, a second inner casing 212, and a third inner casing 213 as the inner casing 21, and the first inner casing 211, the second inner casing 212, and the third inner casing 213 are arranged in order from the upstream side Us toward the downstream side Ds.

A gland part 23 is provided to an inner peripheral surface of the turbine casing 20. The gland part 23 includes a first packing head 231 and a second packing head 232. The first packing head 231 is provided to an inner peripheral surface of the third inner casing 213. The second packing head 232 is provided to an inner peripheral surface of the outer casing 22, at an end part on a side where the third inner casing 213 is positioned. An axial seal member 233 is provided between the first packing head 231 and the second packing head 232.

Further, to inner peripheral surfaces of the respective outer casing 22, first inner casing 211, first packing head 231, and second packing head 232, packing rings 24 are provided. The packing ring 24 has a fin, and is disposed to suppress leakage by narrowing a gap interposed between the packing ring 24 and the turbine rotor 40.

An annular exhaust hood S213 is interposed between the third inner casing 213 and the first packing head 231. A diffuser 25 is provided inside the exhaust hood S213. The diffuser 25 is fixed to the second inner casing 212. Further, a radial seal member 251 is provided between the third inner casing 213 and the diffuser 25.

The turbine rotor 40 is a column-shaped bar body, and is housed inside the turbine casing 20 so that the rotation center axis AX extends in the first horizontal direction x. The turbine rotor 40 is coupled to a power generator (whose illustration is omitted), and when the turbine rotor 40 is rotated, the power generator (whose illustration is omitted) is driven to generate power.

The turbine stage 60 includes a stationary blade 61 and a rotor blade 62.

The stationary blades 61 are disposed at each of an inner peripheral surface of the first inner casing 211 and an inner peripheral surface of the second inner casing 212 in the inner casing 21. The stationary blades 61 are arranged in plural numbers in a rotational direction R (circumferential direction) of the turbine rotor 40, and the plural stationary blades 61 configure a stationary blade cascade. The stationary blade cascades are provided in plural stages, and the plural stages of stationary blade cascades are arranged along the axial direction (x) along the rotation center axis AX of the turbine rotor 40.

The rotor blades 62 are arranged in plural numbers in the rotational direction R of the turbine rotor 40, and the plural rotor blades 62 configure a rotor blade cascade. Similarly to the stationary blade cascades, the rotor blade cascades are provided in plural stages, and the plural stages of rotor blade cascades are arranged along the axial direction (x) along the rotation center axis AX of the turbine rotor 40. Specifically, the stationary blade cascade and the rotor blade cascade are alternately arranged along the axial direction (x).

In the supercritical $CO_2$ turbine 10, a combustor casing 80 configuring a combustor (whose illustration is omitted) is joined to an inlet part of the outer casing 22 by using bolts 81.

Further, the supercritical $CO_2$ turbine 10 is provided with an inlet guide pipe 801. The inlet guide pipe 801 has one end coupled to the combustor (whose illustration is omitted) and the other end coupled to the turbine stage 60 of an initial stage. The inlet guide pipe 801 is disposed so as to penetrate the inside of the combustor casing 80 and penetrate the inside of a through hole formed on the inlet part of the outer casing 22 and the inside of a through hole formed on the first inner casing 211. Here, an inlet sleeve 802 is provided to the through hole formed on the inlet part of the outer casing 22 and the through hole formed on the first inner casing 211, and the inlet guide pipe 801 penetrates the inside of the inlet sleeve 802.

In the supercritical $CO_2$ turbine 10, an exhaust pipe 90 is joined, via a welded portion 91, to a pipe barrel part 22a provided to an outlet part of the outer casing 22. One end of the exhaust pipe 90 is joined to the outer casing 22, and the other end thereof positioned on the opposite side of the one end is joined to an on-site pipe 93 via a welded portion 92.

Further, the supercritical $CO_2$ turbine 10 is provided with an outlet sleeve 901. The outlet sleeve 901 penetrates the pipe barrel part 22a of the outer casing 22, one end thereof is coupled to a pipe barrel part 213a of the third inner casing 213, and the other end thereof is coupled to the exhaust pipe 90.

Hereinafter, operations in which the working media F1, F2, F3 flow, and operations in which the cooling media CF1, CF2, CF3, CF4 flow in the above-described supercritical $CO_2$ turbine 10 will be described in order.

In the supercritical $CO_2$ turbine 10, the working medium F1 is a medium containing carbon dioxide ($CO_2$) in a supercritical state as a main component, and is introduced into the turbine stages 60 from the combustor (whose illustration is omitted) via the inlet guide pipe 801. Subsequently, the working medium F1 flows in the axial direction along the rotation center axis AX, to thereby perform work in each of the plural turbine stages 60. Further, the working medium F2 flowed through the final stage of the turbine stages 60 is discharged to the exhaust hood S213. After that, the working medium F3 is discharged from the exhaust hood S213 to the on-site pipe 93 via the outlet sleeve 901 and the exhaust pipe 90.

In the supercritical $CO_2$ turbine 10, the cooling medium CF1 is, for example, carbon dioxide, and is a medium whose temperature is lower than that of the working medium F1. The cooling medium CF1 is introduced into a flow path provided between an inner peripheral surface of the combustor casing 80 and an outer peripheral surface of the inlet guide pipe 801. Subsequently, the cooling medium CF1 flows through a flow path provided between an inner peripheral surface of the inlet sleeve 802 and the outer peripheral surface of the inlet guide pipe 801. Further, although the illustration is omitted, the cooling medium CF1 is introduced into holes provided to each of the stationary blades 61 and the rotor blades 62, and after cooling the stationary blades 61, the rotor blades 62, and the turbine rotor 40, for example, it is discharged to the outside of the supercritical $CO_2$ turbine 10 via a discharge port (whose illustration is omitted) or mixed to the flow of the working medium F1 or the cooling medium CF2.

Other than the above, in the supercritical $CO_2$ turbine 10, the cooling medium CF2 flows through a space interposed between the third inner casing 213 and the outer casing 22. This cooling medium CF2 is, for example, carbon dioxide, and is a medium whose temperature is lower than that of the working medium F2. Further, the cooling medium CF2 is introduced from a conduit (whose illustration is omitted) communicated with a space interposed between the third inner casing 213 and the outer casing 22. This makes it possible to prevent a temperature of the outer casing 22 from increasing due to heat caused by convection or radiation.

After that, the cooling medium CF3 flows through a flow path positioned between an inner peripheral surface of the pipe barrel part 22a provided to the outlet part of the outer casing 22 and an outer peripheral surface of the outlet sleeve 901. This makes it possible to prevent a temperature of the outer casing 22 from increasing due to heat caused by convection or radiation. Further, after the cooling medium CF4 flows through a flow path positioned between an inner peripheral surface of the exhaust pipe 90 and the outer peripheral surface of the outlet sleeve 901, for example, the cooling medium CF4 is discharged to the outside of the supercritical $CO_2$ turbine 10 via a discharge port (whose illustration is omitted) formed on the exhaust pipe 90.

Note that it is also possible that a cooling medium (whose illustration is omitted) is introduced from the outside into the flow path positioned between the inner peripheral surface of the pipe barrel part 22a provided to the outlet part of the outer casing 22 and the outer peripheral surface of the outlet sleeve 901.

Hereinafter, materials and so on used in the above-described supercritical $CO_2$ turbine 10 will be described.

In the turbine casing 20, the outer casing 22 is required to be thick in order to obtain large strength, by considering an inside pressure. Further, the outer casing 22 has a large size. For this reason, the outer casing 22 is generally manufactured by casting.

In the supercritical $CO_2$ turbine 10, the working medium F1 introduced into an inlet at which it is supplied from the combustor, has a temperature of 800° C. or more and a pressure of 20 MPa or more. Further, the working medium F3 discharged from the outlet of the outer casing 22 has a temperature of 650° C. or more and a pressure of 2 MPa or more. In order to obtain high strength and excellent oxidation resistance at a temperature of 650° C. or more, it can be considered to form respective parts by using, not ferritic heat resistant steel, but austenitic heat resistant steel such as a Ni-based alloy.

However, when manufacturing a large-sized casting by using the austenitic heat resistant steel such as the Ni-based alloy, it is highly possible that a casting defect occurs, and besides, problems regarding segregation and anisotropy of a metal structure arise in some cases. In this case, since it becomes difficult to perform an internal defect inspection due to enlargement of crystal grains, it is not easy to secure a product quality. Depending on materials, it is sometimes technically impossible to perform manufacture. Besides, a unit price of the material is expensive. When these points are taken into consideration, it is not realistic to form the entire outer casing 22 by using the austenitic heat resistant steel such as the Ni-based alloy.

Based on the circumstances as described above, in the above-described supercritical $CO_2$ turbine 10, the outer casing 22 is manufactured through casting by using the ferritic heat resistant steel. Further, parts which are directly brought into contact with exhaust air of high temperature (the third inner casing 213, the first packing head 231, the outlet sleeve 901, the exhaust pipe 90, the diffuser 25) are manufactured through casting by using the austenitic heat resistant steel such as the Ni-based alloy. Further, as described above, in order to prevent the temperature of the outer casing 22 from being a temperature exceeding a heatproof temperature, cooling is performed by using the cooling media CF1, CF2, CF3, CF4.

In the above-described supercritical $CO_2$ turbine 10, the working medium F3 whose temperature is 650° C. or more flows in the exhaust hood S213 provided inside the third inner casing 213. In the exhaust hood S213, the flow of the working medium F3 is fast, and a heat transfer coefficient is high. For this reason, an inner surface of the third inner casing 213 is in a state of high temperature close to the temperature of the working medium F3.

On the contrary, the cooling medium CF2 flows around the third inner casing 213 in order to prevent the temperature of the outer casing 22 from increasing due to the heat of the working medium F3 and the like. For this reason, an outer surface of the third inner casing 213 is in a low temperature state.

As described above, the third inner casing 213 has a temperature difference between its inner surface in the high temperature state and its outer surface in the low temperature state, and thus a large thermal stress is generated. Further, there is a case where a thermal deformation occurs in the third inner casing 213 due to the thermal stress.

When a large thermal deformation occurs in parts which support other components (the first packing head 231, the radial seal member 251, and so on, which are referred to as seal components, hereinafter) in the third inner casing 213, problems sometimes arise such that leakage of a working medium occurs between these thermally-deformed seal components and components facing the seal components to deteriorate a turbine performance, and rubbing in which the turbine rotor 40 and the fin of the packing ring 24 are brought into contact with each other occurs.

When the deformation caused by the thermal stress is accompanied by plastic deformation, a fatigue failure is caused, resulting in that a crack occurs in some cases. In accordance with this, a welding operation is required for repair, and there is a case where a long-term quality deteriorates.

When the temperature and the pressure of the working medium are increased to realize high efficiency of the power generation system, the temperature difference between the inner surface and the outer surface of the third inner casing 213 is further increased. As a result of this, the problem which is ascribable to the thermal stress as described above becomes further serious.

Generally, a temperature difference between an inner surface and an outer surface is reduced by reducing a thickness, which enables to reduce a thermal stress.

In the exhaust hood S213 provided inside the third inner casing 213, the working medium F3 sometimes has a high pressure (2 MPa or more). Further, the third inner casing 213 has a relatively large size. For this reason, the third inner casing 213 is generally manufactured by casting. However, austenitic heat resistant steel such as a Ni-based alloy has a material structure which is likely to be segregated, and a flow of molten metal thereof is also poor. For this reason, it is difficult to manufacture, through casting, the third inner casing 213 having a small thickness, by using the austenitic heat resistant steel such as the Ni-based alloy.

Other than the above, in order to reduce the thermal stress, there can be considered measures such that a heat-insulating coating is formed on the third inner casing 213 or a heat-insulating board is provided to the third inner casing 213. However, when the third inner casing 213 is manufactured by casting, there is created a state where concavity and convexity are formed on a surface of the manufactured casting and the surface has a lot of free-form curves, so that it is not easy to apply the above-described measures.

As still another cooling structure, there is a film cooling (transpiration cooling) structure in which a cooling medium is pushed to be infiltrated from the outside into the inside through a large number of cooling holes, such as one in a gas turbine. With this structure, it is possible to totally reduce the temperature of the third inner casing 213. It is easy to reduce the thermal stress due to the decrease in the temperature difference between the inner and outer surfaces, but, since the third inner casing 213 is relatively large, there is a demerit that a flow rate of a cooling medium becomes very large, and an impact with respect to the performance becomes large.

Based on such circumstances, in the turbine casing 20 configuring the supercritical $CO_2$ turbine 10, it is not easy to reduce the thermal stress in the inner casing such as the third inner casing 213, and thus it is not easy to sufficiently improve reliability.

Also in each of turbines other than the supercritical $CO_2$ turbine 10 (a steam turbine, a gas turbine, a medium turbine, and so on), reliability becomes insufficient in some cases due to a thermal stress, similarly to the above.

Therefore, the problem to be solved by the present invention is to provide a manufacturing method of a turbine casing capable of easily realizing improvement of reliability.

DETAILED DESCRIPTION

A manufacturing method of a turbine casing according to an embodiment is a manufacturing method of a turbine casing which includes an outer casing formed of ferritic heat resistant steel and an inner casing disposed inside the outer casing and formed of austenitic heat resistant steel, and in which an exhaust hood to which a working medium after performing work in turbine stages is exhausted, is covered by the inner casing. Here, the inner casing is manufactured by using members produced by at least either forging or rolling.

First Embodiment

A supercritical $CO_2$ turbine 10 according to a first embodiment will be described by using FIG. 1. Similarly to FIG. 7, FIG. 1 illustrates a partial cross section of a vertical plane (xz plane).

Figure 1:
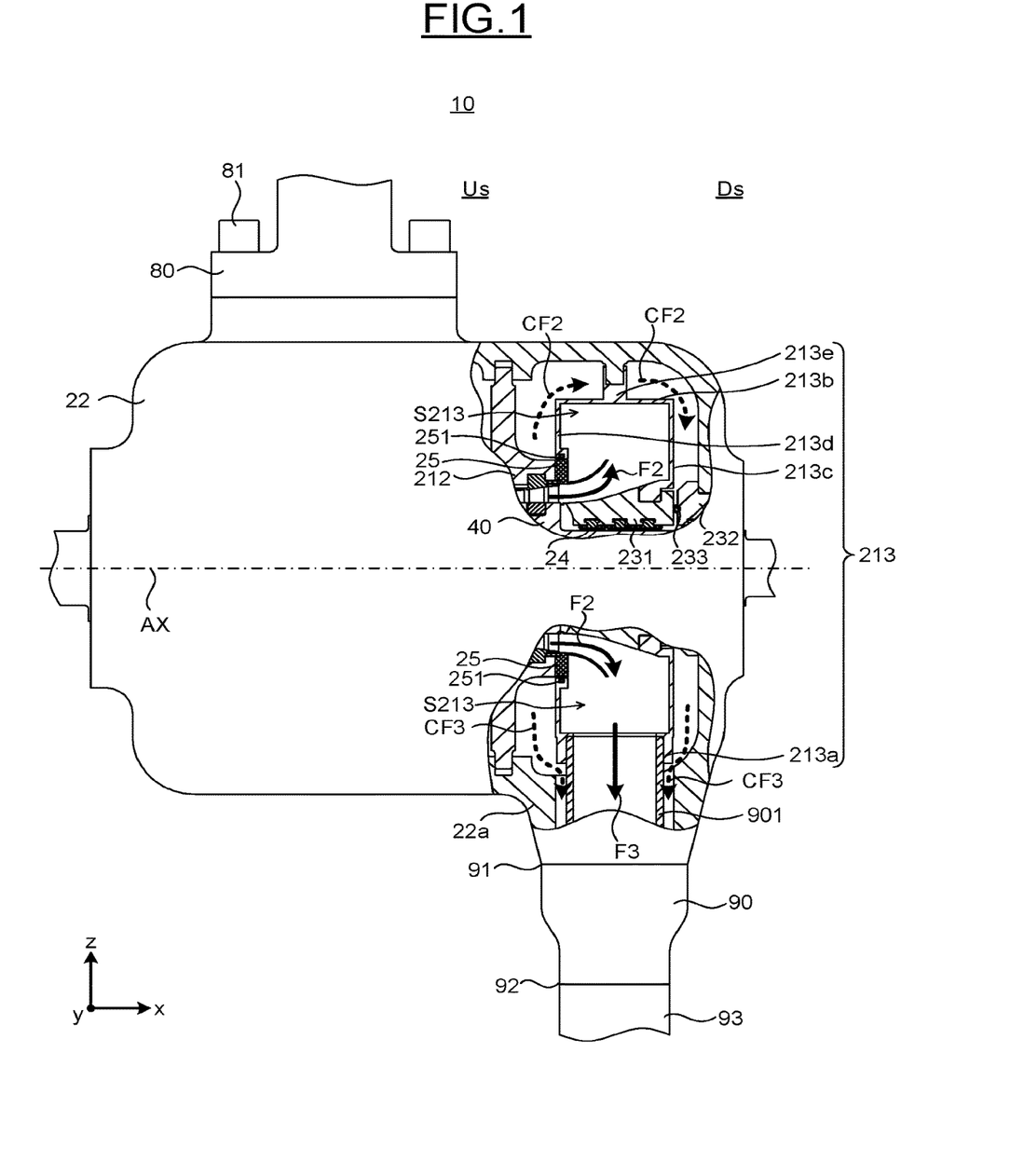
FIG. 1 is a view illustrating a substantial part of a turbine according to a first embodiment.

As illustrated in FIG. 1, in the present embodiment, there are provided an outer casing 22, and an inner casing 21 (a second inner casing 212 and a third inner casing 213 are illustrated in FIG. 1) disposed inside the outer casing 22, and an exhaust hood S213 to which a working medium F2 after performing work in turbine stages is exhausted, is covered by the third inner casing 213. The outer casing 22 is formed of ferritic heat resistant steel. The third inner casing 213 is formed of austenitic heat resistant steel such as a Ni-based alloy. Further, it is configured such that a cooling medium CF2 whose temperature is lower than that of the working medium F2 which flows through the inside of the exhaust hood S213, flows through a space interposed between the outer casing 22 and the third inner casing 213.

However, in the present embodiment, the shape of the third inner casing 213 is different from that of the above-described related art (refer to FIG. 7). Except this point and a point related to this, the present embodiment is similar to the case of the above-described related art. For this reason, explanation of overlapped matters will be appropriately omitted.

In the present embodiment, the third inner casing 213 is produced by using plural members 213a to 213e, as illustrated in FIG. 1. The respective members 213a to 213e are formed of the austenitic heat resistant steel such as the Ni-based alloy, as described above. Here, a pipe barrel part 213a, a wrapper part 213b, a first sidewall part 213c, a second sidewall part 213d, and a coupling part 213e are used as examples of the members configuring the third inner casing 213.

Concretely, the pipe barrel part 213a is a cylindrical-shaped tubular body. The pipe barrel part 213a is disposed at an outer peripheral surface of the wrapper part 213b so that a pipe axis is along with a radial direction of the turbine rotor 40 (corresponding to the vertical direction z in FIG. 1).

The wrapper part 213b is a cylindrical-shaped tubular body, and is disposed so as to be coaxial with the turbine rotor 40. Specifically, the wrapper part 213b is disposed so that a pipe axis is along with an axial direction of the turbine rotor 40 (corresponding to the horizontal direction x in FIG. 1). The wrapper part 213b includes a through hole which penetrates in the radial direction of the turbine rotor 40, and the pipe barrel part 213a is disposed in the through hole.

The first sidewall part 213c is a circular ring-shaped plate body, and is disposed so as to be coaxial with the turbine rotor 40. The first sidewall part 213c is disposed at one end positioned on the downstream side Ds (right side in FIG. 1) of the wrapper part 213b. An outer peripheral side portion of the first sidewall part 213c is joined to the wrapper part 213b. Further, an inner peripheral side of the first sidewall part 213c is formed with a convex portion to be fitted to a concave portion formed on a first packing head 231.

The second sidewall part 213d is a circular ring-shaped plate body, and is disposed so as to be coaxial with the turbine rotor 40, similarly to the first sidewall part 213c. The second sidewall part 213d is disposed at the other end positioned on the upstream side Us (left side in FIG. 1) of the wrapper part 213b. Specifically, the first sidewall part 213c and the second sidewall part 213d are faced in the axial direction of the turbine rotor 40. An outer peripheral side portion of the second sidewall part 213d is joined to the wrapper part 213b. Further, an inner peripheral side of the second sidewall part 213d is provided with a radial seal member 251.

The coupling part 213e is a columnar body, and an inner peripheral side thereof in the radial direction is joined to an outer peripheral surface of the wrapper part 213b. Further, an outer peripheral side of the coupling part 213e is formed with a concave portion so that a convex portion formed on an inner peripheral surface of the outer casing 22 is fitted to the concave portion.

When producing the third inner casing 213, the respective members 213a to 213e of the pipe barrel part 213a, the wrapper part 213b, the first sidewall part 213c, the second sidewall part 213d, and the coupling part 213e are prepared. In the present embodiment, each of the members 213a to 213e is at least either a forged component produced by forging or a rolled component produced by rolling.

Subsequently, the prepared respective members 213a to 213e are assembled. Here, the respective members 213a to 213e are joined by welding, to thereby produce the third inner casing 213.

Concretely, to a portion where the through hole is formed in the wrapper part 213b, the pipe barrel part 213a is joined by welding. Further, the outer peripheral side portion of the first sidewall part 213c and the outer peripheral side portion of the second sidewall part 213d are joined to the wrapper part 213b by welding such as fillet welding or groove welding, for example. Besides, the inner peripheral side in the radial direction in the coupling part 213e is joined, by welding, to the outer peripheral surface of the wrapper part 213b. Each of the wrapper part 213b, the first sidewall part 213c, and the second sidewall part 213d is configured by combining an upper half portion and a lower half portion, for example.

As described above, in the present embodiment, the members 213a to 213e each of which is at least either the forged component or the rolled component are used to manufacture the third inner casing 213. For this reason, in the present embodiment, it is possible to reduce the thickness of the third inner casing 213 when compared to a case of manufacturing the third inner casing 213 by casting as in the case of the related art.

Therefore, in the present embodiment, it is possible to reduce the thermal stress applied to the third inner casing 213, so that the reliability can be sufficiently improved.

Note that there is no need to form all of the respective members 213a to 213e by using the same material. It is possible to appropriately use a suitable material in accordance with required functions. For example, it is possible to appropriately select and use the material in accordance with a level required at each part regarding deformation, oxidation, strength, and so on.

Second Embodiment

Figure 2:
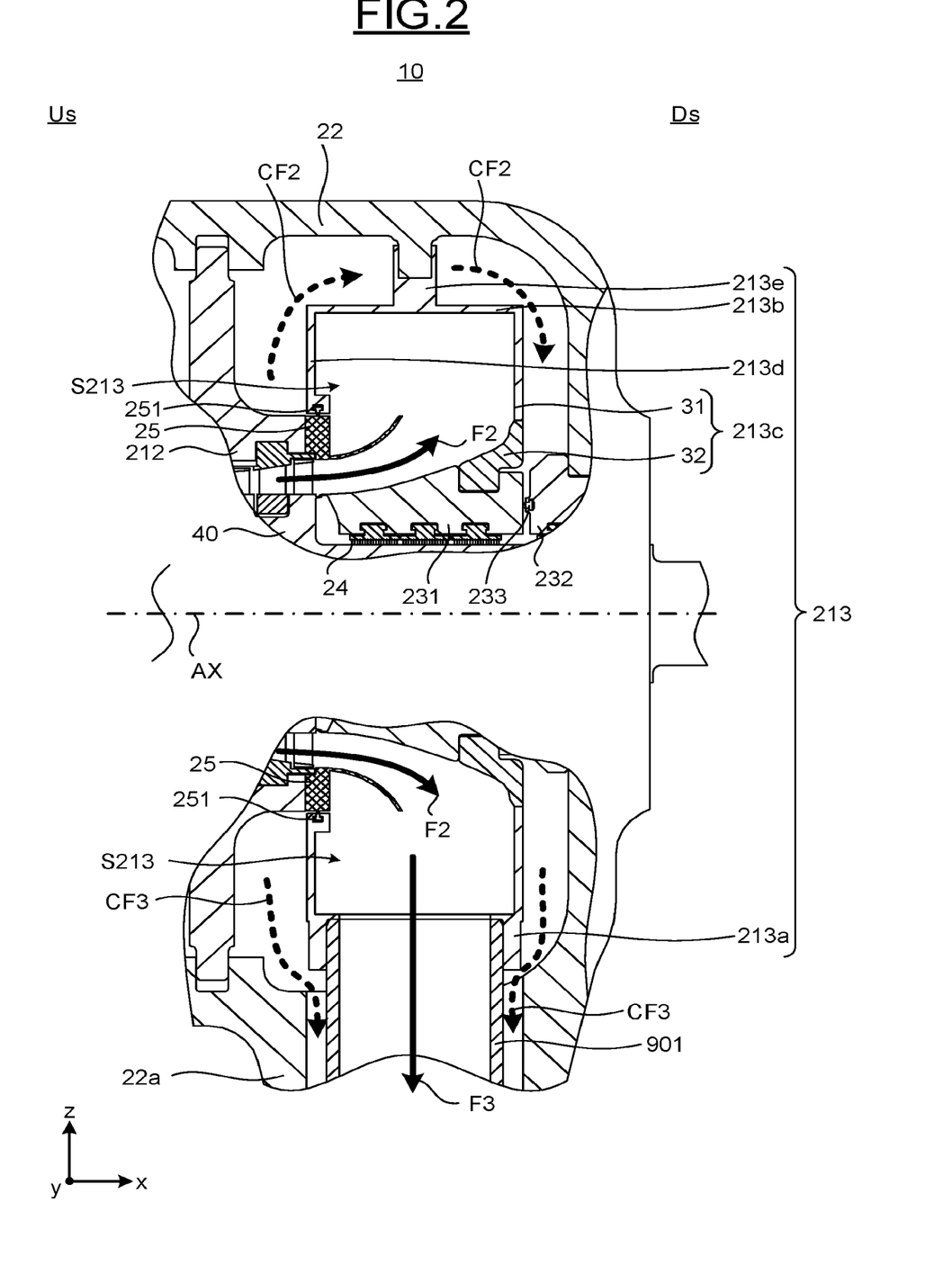
FIG. 2 is a view illustrating a substantial part of a turbine according to a second embodiment.

A supercritical $CO_2$ turbine 10 according to a second embodiment will be described by using FIG. 2. FIG. 2 illustrates a partial cross section of a vertical plane (xz plane), and corresponds to a view in which a part of FIG. 1 is enlarged.

As illustrated in FIG. 2, in the present embodiment, a part of the third inner casing 213 is different from that of the above-described first embodiment (refer to FIG. 1). Except this point and a point related to this, the present embodiment is similar to the case of the first embodiment. For this reason, explanation of overlapped matters will be appropriately omitted.

In the third inner casing 213 of the present embodiment, the first sidewall part 213c is different from that of the first embodiment (refer to FIG. 1), and includes a sidewall main body portion 31 and a fitting portion 32. The sidewall main body portion 31 is a circular ring-shaped plate body, and an outer peripheral side portion thereof is joined to the wrapper part 213b. Further, the fitting portion 32 is joined to an inner peripheral side portion of the sidewall main body portion 31. The fitting portion 32 is formed so as to include a convex portion which is fitted to a concave portion formed on the first packing head 231. The fitting portion 32 may also be formed so as to include a concave portion to which a convex portion formed on the first packing head 231 is fitted, as a matter of course.

In the present embodiment, the sidewall main body portion 31 is at least either a forged component or a rolled component. On the contrary, the fitting portion 32 is a cast component produced by casting.

As described above, when manufacturing the third inner casing 213 in the present embodiment, the fitting portion 32 being the cast component (casting) is used in addition to the sidewall main body portion 31 being at least either the forged component or the rolled component.

The above-described fitting portion 32 has a shape including a free-form curve by taking a flow into consideration for the purpose of reduction in pressure loss and so on. With the use of the casting, it is possible to easily produce an article having a shape including a free-form curve.

Therefore, in the present embodiment, it is possible to easily realize the reduction in pressure loss and so on in addition to the operations and effects exhibited by the first embodiment, so that the improvement of the turbine performance can be realized more easily.

Note that the above-described embodiment is one example, and the other parts may be similarly configured.

Third Embodiment

Figure 3:
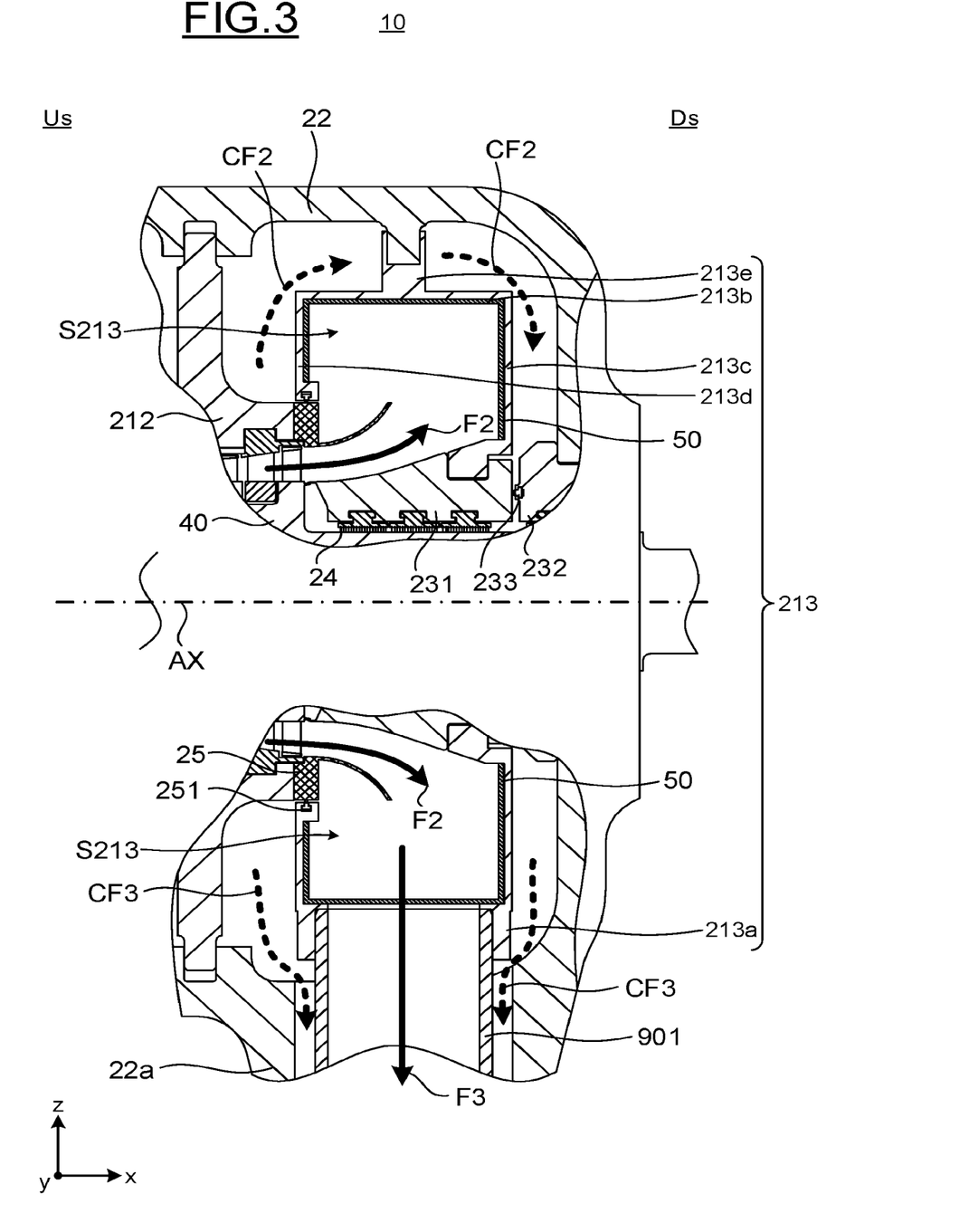
FIG. 3 is a view illustrating a substantial part of a turbine according to a third embodiment.

A supercritical $CO_2$ turbine 10 according to a third embodiment will be described by using FIG. 3. FIG. 3 illustrates a partial cross section of a vertical plane (xz plane), and corresponds to a view in which a part of FIG. 1 is enlarged.

As illustrated in FIG. 3, in the present embodiment, a heat-insulating coating 50 is formed on the third inner casing 213, unlike the case of the above-described first embodiment (refer to FIG. 1). Except this point and a point related to this, the present embodiment is similar to the case of the first embodiment. For this reason, explanation of overlapped matters will be appropriately omitted.

As illustrated in FIG. 3, the heat-insulating coating 50 is provided so as to cover an inside surface of the third inner casing 213. Here, the heat-insulating coating 50 is formed on an inner surface of the members 213a to 213d each of which is at least either the forged component or the rolled component of the third inner casing 213.

Although the illustration is omitted, the heat-insulating coating 50 is, for example, a laminated body formed by sequentially laminating a bond layer and a top layer. The bond layer is formed of a metal material such as MCrAlY (M contains Ni or Co as a main component), for example. On the contrary, the top layer is formed of a ceramic material such as yttria partially stabilized zirconia ($Y_2O_3$—$ZrO_2$), for example.

In the present embodiment, the third inner casing 213 is manufactured by using the members 213a to 213e each of which is at least either the forged component or the rolled component, similarly to the case of the first embodiment. For this reason, in the present embodiment, the inside surface of the third inner casing 213 is a simple flat surface or curved surface with no free-form curve, unlike a surface of a member formed by casting. As a result of this, in the present embodiment, a film thickness of the heat-insulating coating 50 can be easily uniformized. In particular, it is easy to uniformize the film thickness even by automatic coating with the use of a machine.

Therefore, in the present embodiment, since it is easy to apply the heat-insulating coating 50, it is possible to realize the improvement of heat-insulating function in addition to the operations and effects exhibited by the first embodiment.

Note that the above-described embodiment describes the case where the heat-insulating coating 50 is formed on the inner surface of the third inner casing 213, but, the embodiment is not limited to this. It is also possible to form the heat-insulating coating 50 on an outer surface of the third inner casing 213. However, when an obstacle (a flange or the like) which obstructs the coating is provided to the outer surface of the third inner casing 213, it is preferable to form the heat-insulating coating 50 on the inner surface of the third inner casing 213. The effect of heat insulation is also high when the heat-insulating coating 50 is formed on a high-temperature side.

Fourth Embodiment

Figure 4:
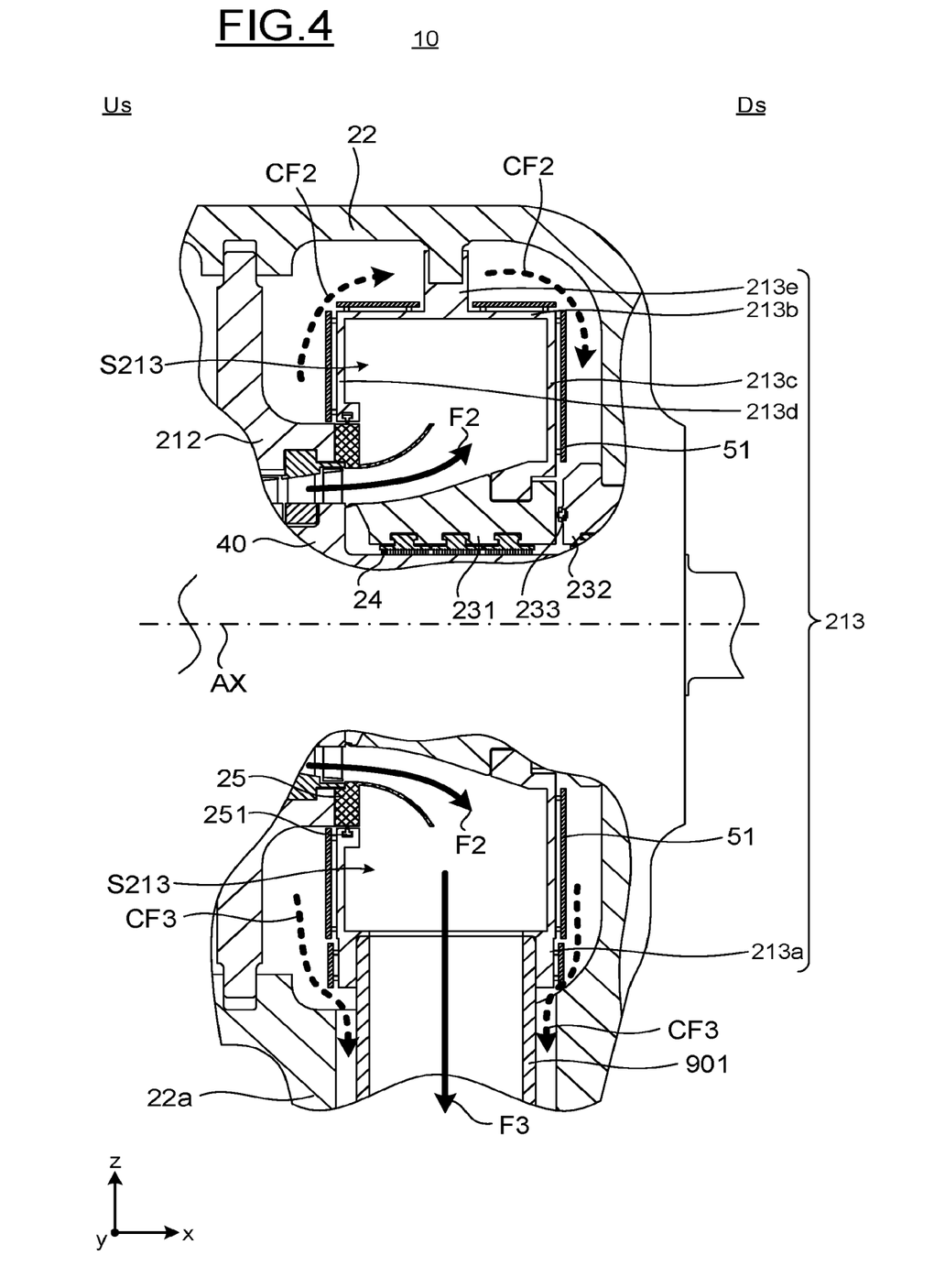
FIG. 4 is a view illustrating a substantial part of a turbine according to a fourth embodiment.

A supercritical $CO_2$ turbine 10 according to a fourth embodiment will be described by using FIG. 4. FIG. 4 illustrates a partial cross section of a vertical plane (xz plane), and corresponds to a view in which a part of FIG. 1 is enlarged.

As illustrated in FIG. 4, in the present embodiment, a heat-insulating board 51 is provided to the third inner casing 213, unlike the case of the above-described first embodiment (refer to FIG. 1). Except this point and a point related to this, the present embodiment is similar to the case of the first embodiment. For this reason, explanation of overlapped matters will be appropriately omitted.

As illustrated in FIG. 4, the heat-insulating board 51 is provided to a surface on the outside of the third inner casing 213. Here, the heat-insulating board 51 is supported by an outer surface of the members 213a to 213d each of which is at least either the forged component or the rolled component of the third inner casing 213, with a gap provided therebetween.

The heat-insulating board 51 is, for example, a plate body formed of the austenitic heat resistant steel, and is fixed to the third inner casing 213 by using a fastening member such as, for example, a rivet or a bolt. Other than the above, it is also possible to fix the heat-insulating board 51 by welding.

In the present embodiment, the third inner casing 213 is manufactured by using the members 213a to 213e each of which is at least either the forged component or the rolled component, similarly to the case of the first embodiment. For this reason, in the present embodiment, the inside surface of the third inner casing 213 is a simple flat surface or curved surface with no free-form curve, unlike a surface of a member formed by casting. As a result of this, in the present embodiment, it is possible to easily attach the heat-insulating board 51.

Therefore, in the present embodiment, since it is easy to attach the heat-insulating board 51, it is possible to realize the improvement of heat-insulating function in addition to the operations and effects exhibited by the first embodiment.

Note that although the above-described embodiment describes the case where the heat-insulating board 51 is disposed on the outer surface of the third inner casing 213, the embodiment is not limited to this. It is also possible to dispose the heat-insulating board 51 on the inner surface of the third inner casing 213. However, when a risk in a case where the heat-insulating board 51 drops off when it is disposed on the inner surface of the third inner casing 213 is taken into consideration, the heat-insulating board 51 is preferably disposed on the outer surface of the third inner casing 213.

Fifth Embodiment

Figure 5A:
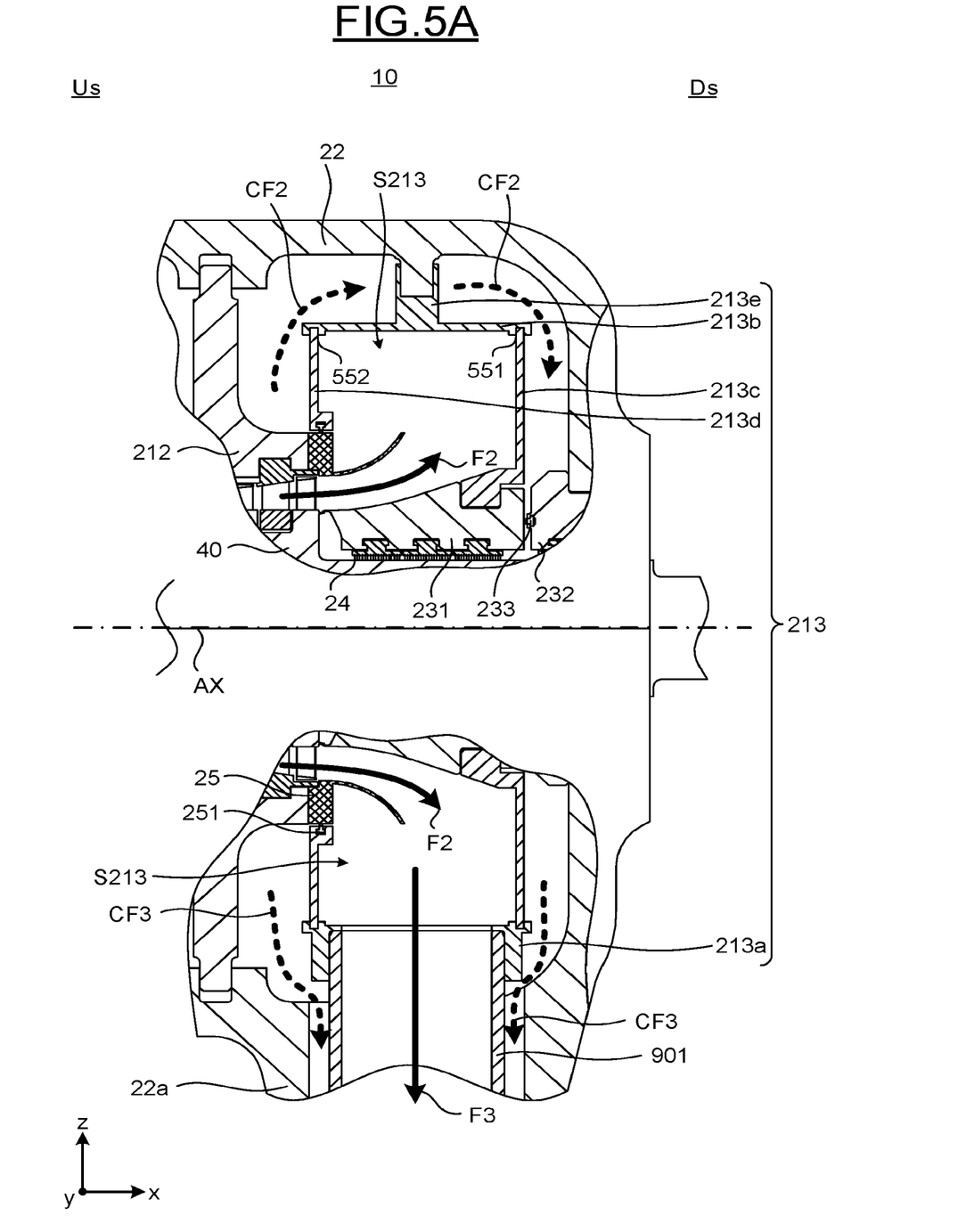
FIG. 5A is a view illustrating a substantial part of a turbine according to a fifth embodiment.

A supercritical $CO_2$ turbine 10 according to a fifth embodiment will be described by using FIG. 5A, FIG. 5B. FIG. 5A illustrates a partial cross section of a vertical plane (xz plane), and corresponds to a view in which a part of FIG. 1 is enlarged. Further, FIG. 5B illustrates, in an enlarged manner, a cross section of a part (upper half part) of the third inner casing 213.

Figure 5B:
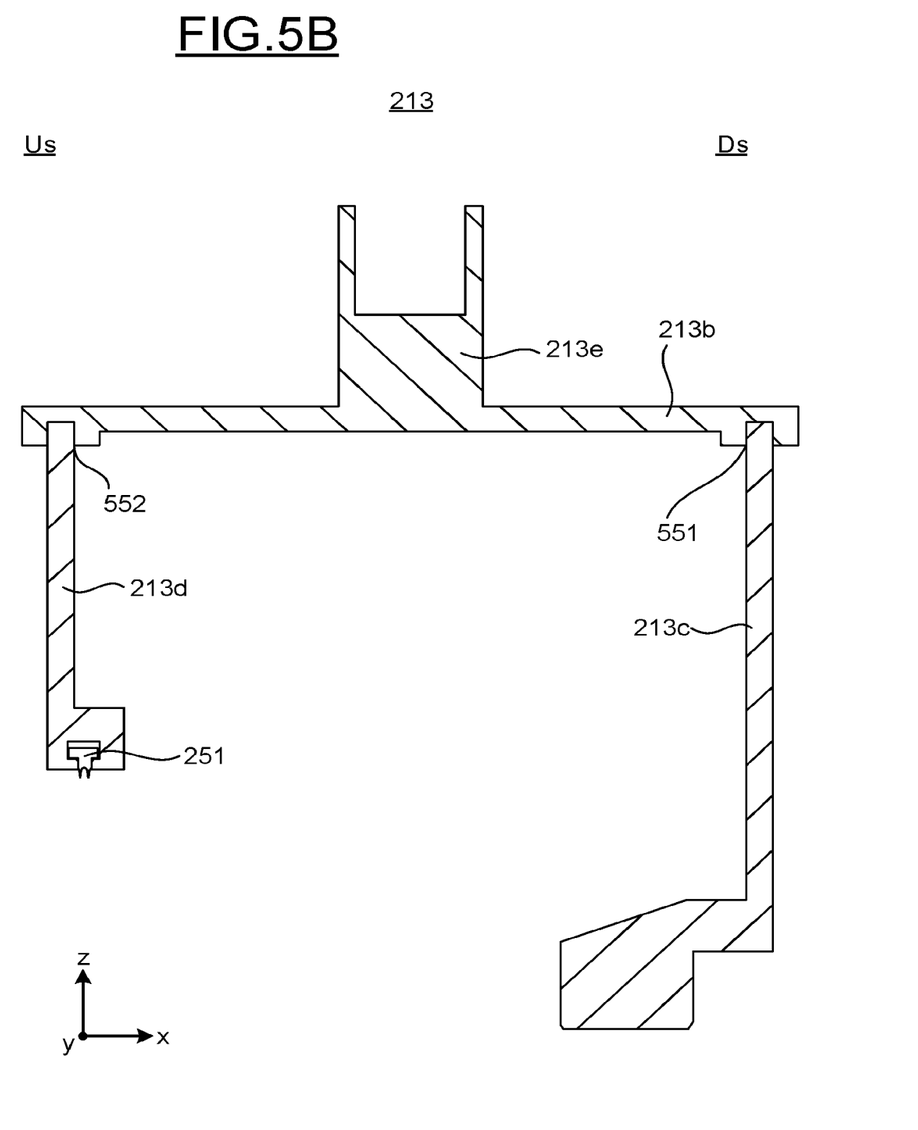
FIG. 5B is a view illustrating, in an enlarged manner, a part of a third inner casing in the turbine according to the fifth embodiment.

In the present embodiment, the third inner casing 213 is produced by using plural members 213a to 213e, similarly to the case of the first embodiment, as illustrated in FIG. 5A, FIG. 5B. However, in the present embodiment, a method of coupling the wrapper part 213b and the first sidewall part 213c, and a method of coupling the wrapper part 213b and the second sidewall part 213d are different from those of the above-described first embodiment (refer to FIG. 1). Except this point and a point related to this, the present embodiment is similar to the case of the first embodiment. For this reason, explanation of overlapped matters will be appropriately omitted.

As illustrated in FIG. 5A, FIG. 5B, insertion-receiving portions 551, 552 are provided to an inner peripheral surface (a lower side surface in FIG. 5B) of the wrapper part 213b.

Here, the insertion-receiving portion 551 is provided at one end portion positioned on the downstream side Ds (right side in FIG. 5B) of the wrapper part 213b. The insertion-receiving portion 551 includes a concave portion, and when an outer peripheral portion of the first sidewall part 213c is inserted into the concave portion, the first sidewall part 213c is fitted to the insertion-receiving portion 551.

Further, the insertion-receiving portion 552 is provided at the other end portion positioned on the upstream side Us (left side in FIG. 5B) of the wrapper part 213b. The insertion-receiving portion 552 includes a concave portion, and when an outer peripheral portion of the second sidewall part 213d is inserted into the concave portion, the second sidewall part 213d is fitted to the insertion-receiving portion 552.

In a manner as above, it is also possible that the third inner casing 213 does not have a structure in which all of the plural members 213a to 213e are integrally coupled.

As described above, in the present embodiment, the wrapper part 213b and the first sidewall part 213c are joined by, not welding, but fitting. In like manner, the wrapper part 213b and the second sidewall part 213d are joined by, not welding, but fitting. For this reason, in the present embodiment, it is possible to suppress occurrence of crack due to occurrence of hardening in the vicinity of a welded portion. Further, when the wrapper part 213b, and the first and second sidewall parts 213c, 213d are formed of different materials, the structural stability decreases in some cases at a welding boundary surface, but, this problem can be prevented from occurring in the present embodiment.

As a result of this, a man-hour in the welding operation can be reduced, and it is possible to realize a reduction in an inspection operation and a repair operation of a welded portion and so on. Therefore, in the present embodiment, it is possible to realize a reduction in construction period and improvement of long-term reliability.

Note that it is also possible that a concave portion is formed on the first sidewall part 213c, and a convex portion to be inserted into the concave portion is formed on the wrapper part 213b. Further, it is also possible that a concave portion is formed on the second sidewall part 213d, and a convex portion to be inserted into the concave portion is formed on the wrapper part 213b, as a matter of course.

Sixth Embodiment

Figure 6A:
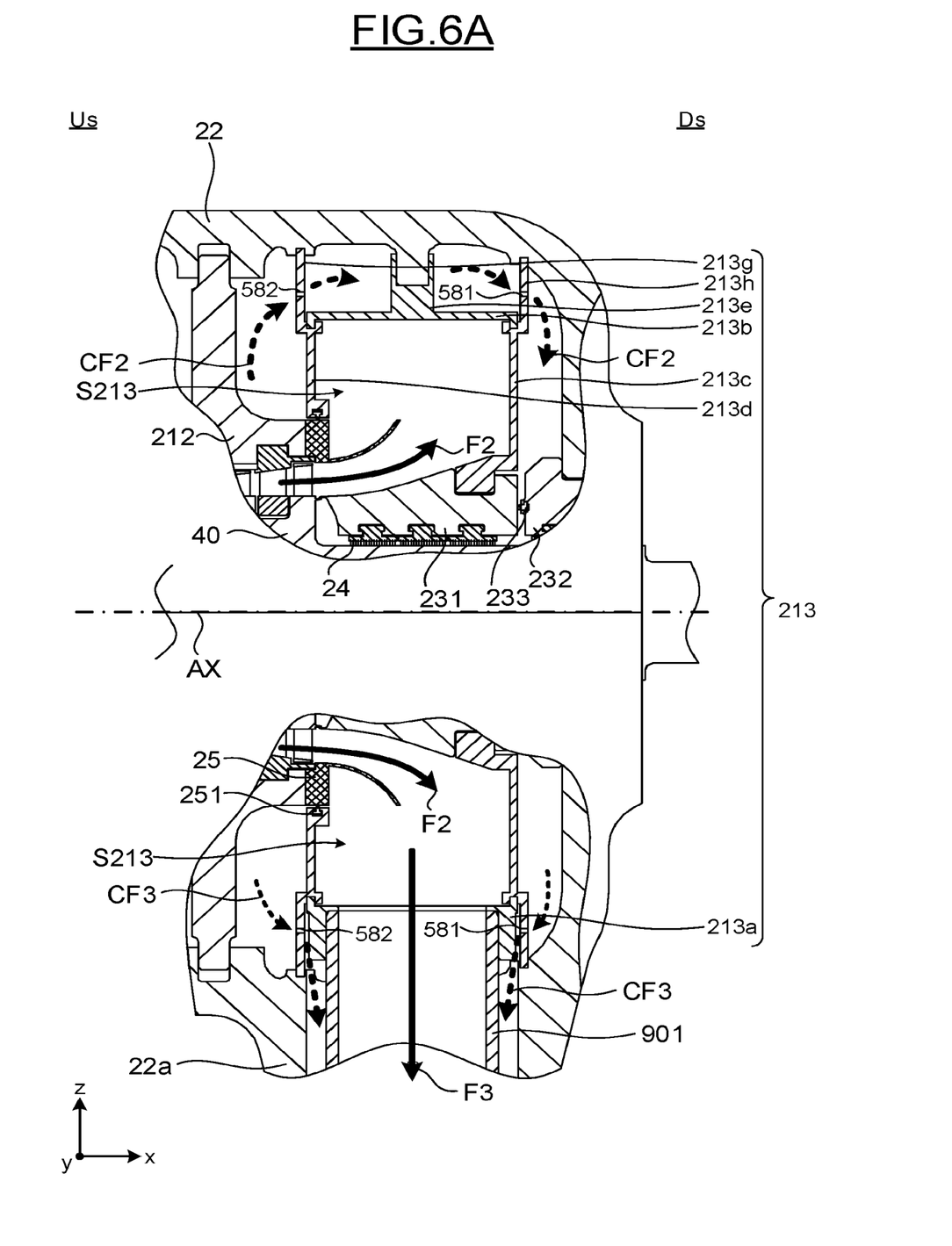
FIG. 6A is a view illustrating a substantial part of a turbine according to a sixth embodiment.

A supercritical $CO_2$ turbine 10 according to a sixth embodiment will be described by using FIG. 6A, FIG. 6B. FIG. 6A illustrates a partial cross section of a vertical plane (xz plane), similarly to FIG. 5A. Further, FIG. 6B illustrates, in an enlarged manner, a cross section of a part (upper half part) of the third inner casing 213, similarly to FIG. 5B.

Figure 6B:
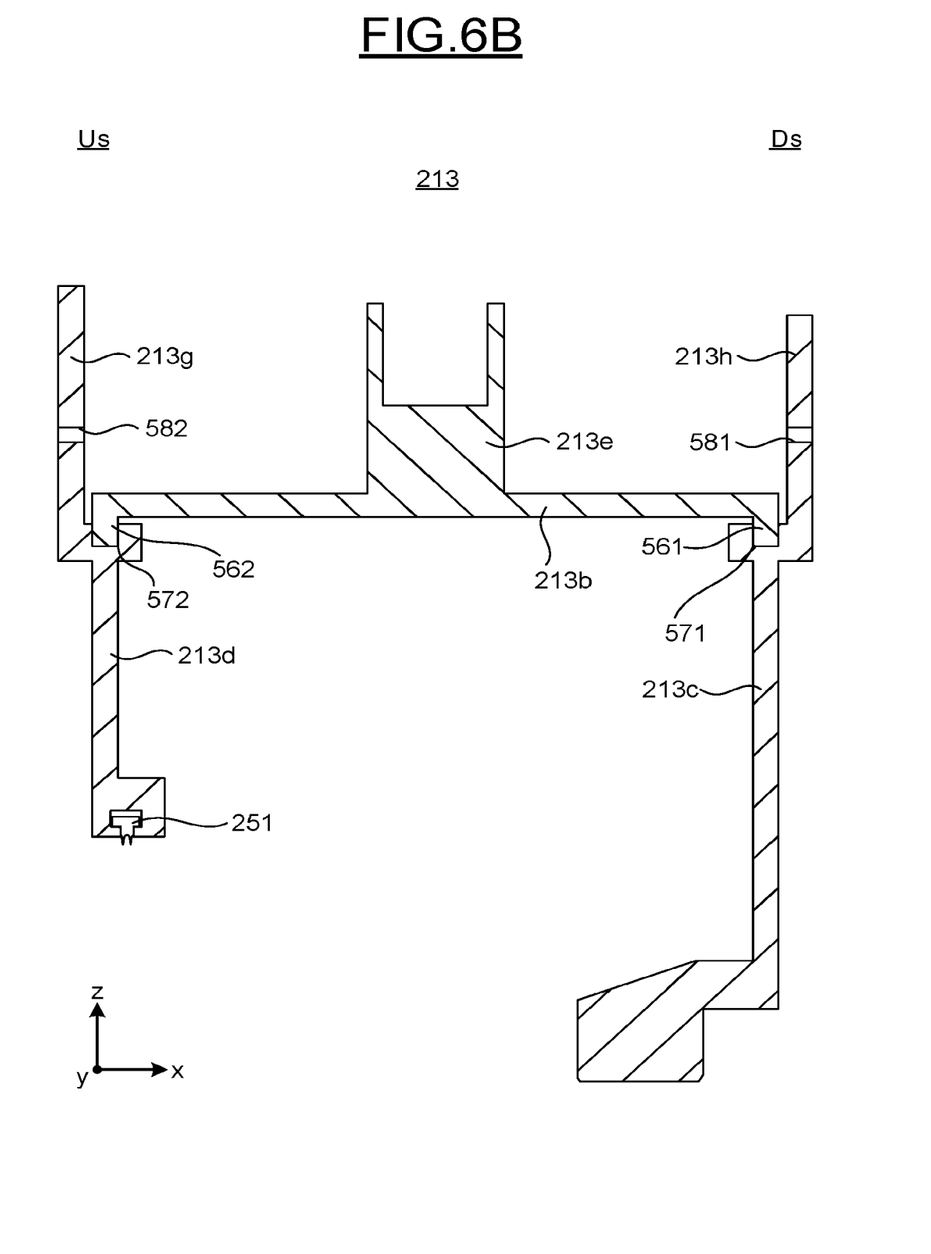
FIG. 6B is a view illustrating, in an enlarged manner, a part of a third inner casing in the turbine according to the sixth embodiment.

In the present embodiment, the third inner casing 213 is produced by using plural members 213a to 213e, similarly to the case of the fifth embodiment, as illustrated in FIG. 6A, FIG. 6B. However, in the present embodiment, a method of coupling the wrapper part 213b and the first sidewall part 213c, and a method of coupling the wrapper part 213b and the second sidewall part 213d are different from those of the above-described fifth embodiment (refer to FIG. 5A, FIG. 5B). Besides, in the production of the third inner casing 213, other members 213h, 213g are used. Except this point and a point related to this, the present embodiment is similar to the case of the fifth embodiment. For this reason, explanation of overlapped matters will be appropriately omitted.

As illustrated in FIG. 6A, FIG. 6B, insertion portions 561, 562 are provided to an inner peripheral surface (a lower side surface in FIG. 6B) of the wrapper part 213b. Here, the insertion portion 561 is provided at one end portion positioned on the downstream side Ds (right side in FIG. 5B) of the wrapper part 213b. Further, the insertion portion 562 is provided at the other end portion positioned on the upstream side Us (left side in FIG. 5B) of the wrapper part 213b. The insertion portions 561, 562 include convex portions.

An insertion-receiving portion 571 is provided to an outer peripheral portion (an upper side portion in FIG. 6B) of the first sidewall part 213c. The insertion portion 561 provided to the wrapper part 213b is inserted into the insertion-receiving portion 571 provided to the first sidewall part 213c.

Further, an insertion-receiving portion 572 is provided to an outer peripheral portion of the second sidewall part 213d, similarly to the first sidewall part 213c. The insertion portion 562 provided to the wrapper part 213b is inserted into the insertion-receiving portion 572 provided to the second sidewall part 213d.

The insertion-receiving portion 571 of the first sidewall part 213c is provided with a third sidewall part 213h. The third sidewall part 213h is a circular ring-shaped plate body, and is disposed so as to be coaxial with the turbine rotor 40. The third sidewall part 213h is disposed at one end positioned on the downstream side Ds (right side in FIG. 6B) of the insertion-receiving portion 571 of the first sidewall part 213c. An outer peripheral side portion of the third sidewall part 213h is inserted into and fitted to a concave portion formed on an inner peripheral surface of the outer casing 22. An inner peripheral side portion of the third sidewall part 213h is joined to the insertion-receiving portion 571 of the first sidewall part 213c by welding. Further, in the third sidewall part 213h, a through hole 581 penetrating in an axial direction is formed. The through hole 581 is provided in plural numbers in a rotational direction.

The insertion-receiving portion 572 of the second sidewall part 213d is provided with a fourth sidewall part 213g. The fourth sidewall part 213g is a circular ring-shaped plate body, and is disposed so as to be coaxial with the turbine rotor 40. The fourth sidewall part 213g is disposed at the other end positioned on the upstream side Us (left side in FIG. 6B) of the insertion-receiving portion 572 of the second sidewall part 213d. An outer peripheral side portion of the fourth sidewall part 213g is inserted into and fitted to a concave portion formed on an inner peripheral surface of the outer casing 22. An inner peripheral side portion of the fourth sidewall part 213g is joined to the insertion-receiving portion 572 of the second sidewall part 213d by welding. Further, in the fourth sidewall part 213g, a through hole 582 penetrating in an axial direction is formed. The through hole 582 is provided in plural numbers in the rotational direction.

In the present embodiment, the cooling medium CF2 flows through a space interposed between the third inner casing 213 and the outer casing 22 by sequentially passing through the through holes 582 of the fourth sidewall part 213g and the through holes 581 of the third sidewall part 213h.

Further, the cooling medium CF3 flows through a flow path positioned between the inner peripheral surface of the pipe barrel part 22a provided to the outlet part of the outer casing 22 and the outer peripheral surface of the outlet sleeve 901 via the through holes 582 of the fourth sidewall part 213g and the through holes 581 of the third sidewall part 213h.

As described above, in the present embodiment, the wrapper part 213b and the first sidewall part 213c are joined by, not welding, but fitting, similarly to the case of the fifth embodiment. Further, the wrapper part 213b and the second sidewall part 213d are joined by, not welding, but fitting. For this reason, in the present embodiment, it is possible to suppress occurrence of crack due to occurrence of hardening in the vicinity of a welded portion. Further, when the wrapper part 213b, and the first and second sidewall parts 213c, 213d are formed of different materials, the structural stability decreases in some cases at a welding boundary surface, but, this problem can be prevented from occurring in the present embodiment.

As a result of this, a man-hour in the welding operation can be reduced, and it is possible to realize a reduction in an inspection operation and a repair operation of a welded portion and so on. Therefore, in the present embodiment, it is possible to realize a reduction in construction period and improvement of long-term reliability.

Note that although the illustration is omitted, it is also possible that insertion-receiving portions are provided to the wrapper part 213b and insertion portions are provided to the first sidewall part 213c and the second sidewall part 213d, unlike the above description. Further, the flow of the cooling medium CF2 may also be opposite to that of the above-described case.

Others

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, although the above-described embodiments describe the supercritical $CO_2$ turbine 10 configuring the supercritical $CO_2$ power generation system, the embodiments are not limited to this. Each of turbines other than the supercritical $CO_2$ turbine 10 configuring the supercritical $CO_2$ power generation system (a steam turbine, a gas turbine, a medium turbine, and so on) can also apply manufacture by using members produced by at least either forging or rolling, and the like regarding an inner casing covering an exhaust hood, in a similar manner. This makes it possible to exhibit operations and effects similar to those of the above-described embodiments. The above-described temperature conditions and pressure conditions of the working media indicate values when the working media contain carbon dioxide ($CO_2$) in a supercritical state as a main component, and can be arbitrarily set in accordance with the working media.

REFERENCE SIGNS LIST

10 . . . supercritical $CO_2$ turbine, 20 . . . turbine casing, 21 . . . inner casing, 22 . . . outer casing, 22a . . . pipe barrel part, 23 . . . gland part, 24 . . . packing ring, 25 . . . diffuser, 31 . . . sidewall main body portion, 32 . . . fitting portion, 40 . . . turbine rotor, 50 . . . heat-insulating coating, 51 . . . heat-insulating board, 60 . . . turbine stage, 61 . . . stationary blade, 62 . . . rotor blade, 80 . . . combustor casing, 81 . . . bolt, 90 . . . exhaust pipe, 91 . . . welded portion, 92 . . . welded portion, 93 . . . on-site pipe, 211 . . . first inner casing, 212 . . . second inner casing, 213 . . . third inner casing, 213a . . . pipe barrel part, 213b . . . wrapper part, 213c . . . first sidewall part, 213d . . . second sidewall part, 213e . . . coupling part, 213g . . . third sidewall part, 213h . . . fourth sidewall part, 231 . . . first packing head, 232 . . . second packing head, 233 . . . axial seal member, 251 . . . radial seal member, 551 . . . insertion-receiving portion, 552 . . . insertion-receiving portion, 561 . . . insertion portion, 562 . . . insertion portion, 571 . . . insertion-receiving portion, 572 . . . insertion-receiving portion, 581 . . . through hole, 582 . . . through hole, 801 . . . inlet guide pipe, 802 . . . inlet sleeve, 901 . . . outlet sleeve, AX . . . rotation center axis, CF1, CF2, CF3, CF4 . . . cooling medium, Ds . . . downstream side, F1, F2, F3 . . . working medium, S213 . . . exhaust hood, Us . . . upstream side

What is claimed is:

1. A manufacturing method of a turbine casing including an outer casing formed of ferritic heat resistant steel and an inner casing disposed inside the outer casing and formed of austenitic heat resistant steel,
   the inner casing housing a turbine rotor and plural turbine stages,
   the plural turbine stages being arranged in an axial direction along a rotation center axis of the turbine rotor,
   the inner casing including an exhaust hood part having an exhaust hood to which a working medium after performing work in turbine stages is exhausted,
   the turbine casing being configured to make a cooling medium flow through a space interposed between the outer casing and the exhaust hood part a temperature of the cooling medium being lower than that of the working medium which flows through an inside of the exhaust hood,
   the exhaust hood part comprising:
      a wrapper part being a cylindrical-shaped tubular body, being disposed so that an axis of the wrapper part is along with the axial direction;
      a first sidewall part disposed at one end position in the axial direction of the wrapper part; and
      a second sidewall part disposed at other end position in the axial direction of the wrapper part,
   the manufacturing method of the turbine casing, comprising:
   manufacturing at least one of the wrapper part, the first sidewall part, and the second sidewall part by at least either forging or rolling.

2. The manufacturing method of the turbine casing according to claim 1,
   the exhaust hood part further comprising a pipe barrel part being a cylindrical-shaped tubular body, the wrapper part including a through hole which penetrates in the radial direction of the turbine rotor, the pipe barrel part being disposed in the through hole at an outer peripheral surface of the wrapper part so that an axis of the pipe barrel part is along with the radial direction, the manufacturing method of the turbine casing, further comprising:

manufacturing the pipe barrel part by at least either forging or rolling.

3. The manufacturing method of the turbine casing according to claim 1, wherein the inner casing is manufactured by using a member produced by casting, in addition to the members produced by at least either the forging or the rolling.

4. The manufacturing method of the turbine casing according to claim 1, wherein a heat-insulating coating is provided to the at least one of the wrapper part, the first sidewall part, and the second sidewall part produced by at least either the forging or the rolling.

5. The manufacturing method of the turbine casing according to claim 1, wherein a heat-insulating board is provided to the at least one of the wrapper part, the first sidewall part, and the second sidewall part produced by at least either the forging or the rolling.

6. The manufacturing method of the turbine casing according to claim 1, wherein in the turbine casing, the working medium contains a $CO_2$ gas in a supercritical state.

* * * * *